United States Patent [19]

Hill

[11] Patent Number: 5,398,044
[45] Date of Patent: Mar. 14, 1995

[54] METHOD OF AND AN ARRANGEMENT FOR CONTROLLING THE CURSOR MOVEMENT ON A GRAPHICAL DISPLAY

[75] Inventor: Tapio Hill, Helsinki, Finland

[73] Assignee: ICL Personal Systems OY, Helsinki, Finland

[21] Appl. No.: 163,159

[22] Filed: Dec. 7, 1993

[30] Foreign Application Priority Data

Dec. 11, 1992 [FI] Finland .................................. 925645

[51] Int. Cl.$^6$ ............................................. G09G 3/02
[52] U.S. Cl. ..................... 345/145; 345/157; 345/163
[58] Field of Search ............. 345/113, 164, 165, 166, 345/159, 145, 157, 163

[56] References Cited

U.S. PATENT DOCUMENTS

| 4,987,411 | 1/1991 | Ishigami | 345/159 |
| 5,119,077 | 6/1992 | Giorgio | 345/163 |
| 5,195,179 | 3/1993 | Tokunaga | 345/163 |

FOREIGN PATENT DOCUMENTS

| 9105326 | 4/1991 | WIPO | 345/163 |

OTHER PUBLICATIONS

IBM, "Bimodal mouse", Jun. 1986, pp. 421–422.

Primary Examiner—Alvin E. Oberley
Assistant Examiner—Minsun Oh
Attorney, Agent, or Firm—Fitch, Even, Tabin & Flannery

[57] ABSTRACT

The invention relates to a method of and an arrangement for controlling the cursor movement on a computer display by means of a pointing device such as a mouse. The mouse driver, which is installed in the computer, converts the manually caused movement of the ball of the mouse to a corresponding scaled movement of the cursor on the display. In accordance with the invention, the mouse driver has a first mode, in which the cursor is moved on the display only as long as the mouse ball is in movement and only a distance that is directly proportional to its travel, and a second mode which is activated when a predetermined one of the control buttons of the mouse is activated and in which the movement of the cursor that is caused by a short movement of the mouse ball is continued in the same direction after the movement of the ball has stopped until said predetermined one of the control buttons is released, the cursor reaches the edge of the display or a new direction of movement is initiated by a movement of the mouse ball.

8 Claims, 2 Drawing Sheets

METHOD OF AND AN ARRANGEMENT FOR CONTROLLING THE CURSOR MOVEMENT ON A GRAPHICAL DISPLAY

FIELD OF THE INVENTION

The present invention relates to a method of and an arrangement for controlling the cursor movement on a computer display by means of a pointing device such as a mouse.

BACKGROUND OF THE INVENTION

Today, in addition to the display, the keyboard and the other peripheral devices, a so-called mouse is usually connected with a thin cord or cordlessly to the central processing unit. When moved about, the mouse enables easier control of the cursor on the display and serves to replace the cursor control buttons on the keyboard. The mouse is a pointing device which usually comprises a small box that is moved about on a desktop, the box having on its underside a ball that communicates information on the movement of the mouse to the computer's central processing unit. Between the mouse and the operating system there is a program, the mouse driver, which in conjunction with the operating system then converts the movement of the mouse ball to a corresponding scaled cursor movement on the display. The use of a mouse is today in practice a necessity in various graphical user interfaces such as GEM (Graphics Environment Master) and Microsoft Windows. In these programs the mouse is used to move the cursor and to point and mark areas.

In present-day solutions the movement of the mouse ball is converted directly to scaled movement in the corresponding direction on the display. In general, scaling is such that moving the cursor, for example, from one edge of the display to the other requires that the mouse make a very long sweep on the desktop or that the mouse be lifted from the desktop, the same movement being repeated several times. The length of the sweeps grows as displays become larger and the resolution of display controllers increases. It has previously been attempted to correct the problem by reducing the range of movement before a long sweep by changing the resolution of the pointing device (scaling). The change in resolution nevertheless makes use of the pointing device slower.

SUMMARY OF THE INVENTION

It is an object of the present invention to enable the cursor to make long movements by means of the pointing device without having to make ergonomically poor, physically taxing series of movements or a change in resolution that slows down use of the mouse.

This is accomplished according to the invention by a method of controlling the cursor movement on a computer display by means of a pointing device such as a mouse having at least two control buttons, said method comprising the steps of activating a predetermined one of the control buttons of the pointing device, causing manually a movement of the pointing device, converting said movement to a corresponding scaled movement of the cursor on the display, stopping said movement of the pointing device, and continuing said movement of the cursor in the same direction on the display until said predetermined one of the control buttons is released, the cursor reaches the edge of the display or a new direction of movement is initiated by a movement of the pointing device.

The invention also relates to an arrangement for controlling the cursor movement on a computer display by means of a pointing device such as a mouse, which arrangement comprises a pointing device having a control ball and at least two control buttons, and a pointing device driver installed in the computer for converting a manually caused movement of the ball of the pointing device to a corresponding scaled movement of the cursor on the display, said driver having a first mode in which the cursor is moved on the display only as long as the control ball of the pointing device is in movement and only a distance that is directly proportional to its travel, and a second mode which is activated when a predetermined one of the control buttons of the pointing device is activated and in which the movement of the cursor that is caused by a short movement of said ball of the pointing device is continued in the same direction after the movement of the ball has stopped until said predetermined one of the control buttons is released, the cursor reaches the edge of the display or a new direction of movement is initiated by a movement of the ball of the pointing device.

The basic idea of the invention is to reserve one of the control buttons of the pointing device to indicate continuous movement of the cursor. When this button is held pressed down, the cursor travels automatically on the display (without the pointing device being continuously moved) in the direction which was indicated by a short direction-imparting movement of the pointing device until either the button is released, the cursor reaches the edge of the display or the cursor is given a new direction of travel by a movement of the pointing device. By means of the invention, the length of the movement of the pointing device is kept short, thereby avoiding many of the drawbacks which are traditionally associated with use of a pointing device; the necessary desktop area is reduced and it becomes unnecessary to lift the pointing device from its base, thus improving the ergonomy of using a pointing device. The method is not dependent on the type of the pointing device and it can in practice be implemented by software in the driver of the pointing device (mouse driver). It also facilitates the use of the pointing device commonly used in portable microcomputers, in which the ball of the pointing device is rotated manually.

BRIEF DESCRIPTION OF THE DRAWINGS

The invention will be described in greater detail in the following by means of preferred embodiments with reference to the accompanying drawings, in which.

PREFERRED EMBODIMENTS OF THE INVENTION

Figure 1:
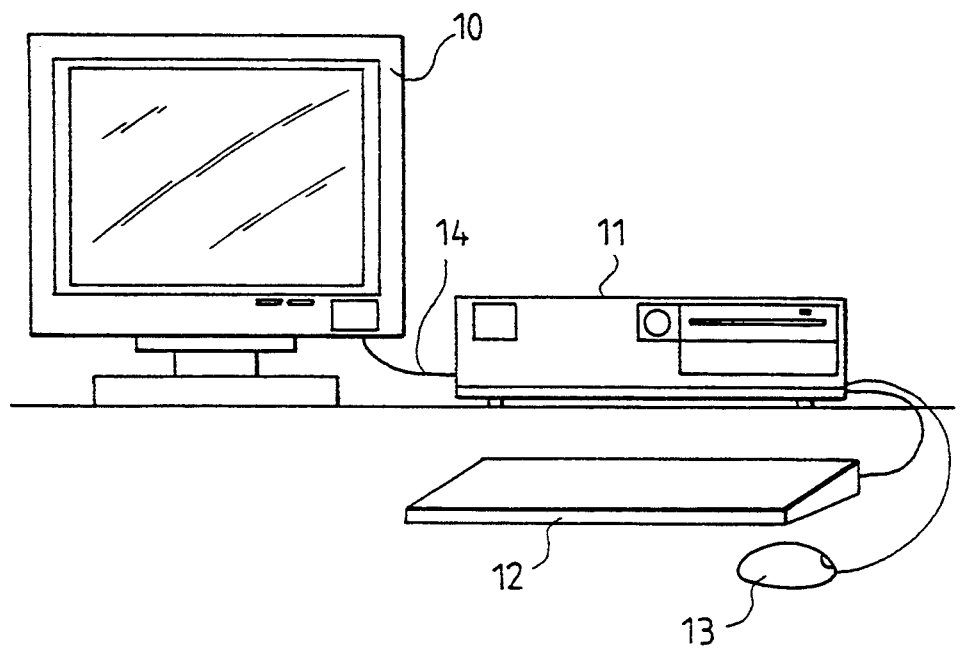
FIG. 1 shows a typical computer system in which the invention, for example, can be used.

The present invention is suitable for use in any computer system or hardware in which a pointing device, i.e., a mouse, is used to control the cursor on the display. FIG. 1 shows a computer system comprising a central processing unit 11, to which are connected a keyboard 12, a pointing device 13 (a mouse), and a display system with its display device 10. The central processing unit can be, for example, an IBM-compatible microcomputer such as the ICL Personal Systems MikroMikko 4, which has a graphical user interface, for example, Microsoft Windows or GEM (Graphics Environment Masters).

Figure 2:
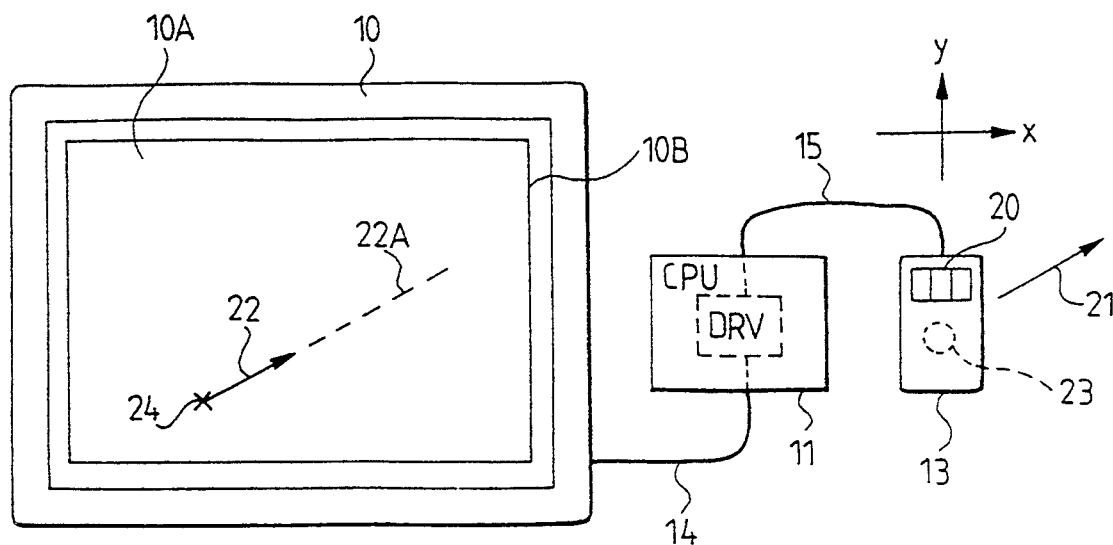
FIG. 2 shows a schematic view of a display, a computer and a mouse driver, and the movement of the cursor on the display by means of a mouse.

The pointing device 13, i.e., a mouse, is generally a small box which is moved about on the desktop and which has on its underside a ball 23 (FIG. 2) which communicates information on the movement of the mouse to the computer. The mouse 13 is used to move the cursor or to point and mark areas on the display and it can serve to replace the cursor control buttons on the keyboard 12 and the commands inputted from the keyboard 12. A mouse driver DRV in the computer's central processing unit is a program between the mouse and the computer's operating system (e.g., DOS). The mouse driver DRV converts, on the basis of the movement information communicated from the mouse 13 with a thin cord 15 or cordlessly, the movement 21 of the ball 23 of the mouse 13 to a corresponding scaled movement 22 on the display 10A of the display device 10. In conventional solutions the cursor 24 moves on the display 10 a distance which in scaling ratio is directly proportional to the travel 21 of the ball 23. Conventionally, when the movement of the ball 23 comes to a stop, the movement of the cursor 24 on the display also comes to a stop at the same time. Usually the mouse 13 has two or three control buttons, of which only one (the left-hand button) is generally in use in programs.

The principle and operation of the mouse and the mouse driver are described, for example, in the article "How do they run? A look at the three common mouse interfaces", Jeff Prosise, PC Magazine, May 28, 1991, pp. 413–416, which is incorporated herein by reference.

A suitable mouse is, for example, the Pilot Mouse of Logitech Inc. A mouse driver program DRV suitable for the mouse is always supplied with the mouse. Alternatively, the mouse can also be of a kind in which the small box remains stationary and the ball 23 is rotated manually, generally with the thumb. Examples of mice of this kind are the TRACKMAN and TRACKMAN Portable of Logitech Inc. An example of a cordless mouse is the MOUSEMAN Cordless of Logitech Inc.

In the present invention the object is to facilitate performing of long sweeps of the cursor 24 with the mouse 13. The mouse driver DRV is altered such that it has two modes: i) a normal mode in which the cursor 24 is moved on the display only as long as the ball 23 of the mouse 13 is in movement and only a distance that is directly proportional to its travel, such as in conventional solutions; ii) a mode intended for long movements. Selection of the mode can be controlled with a predetermined one of the control buttons of the mouse 13, for example, the middle button 20, which is generally not in use with application programs. When the control button 20 is pressed down (activated) and the mouse driver DRV is in the long movement mode, the mouse driver DRV continues the movement 22 of the cursor 24—caused by a short movement of the ball 23 of the mouse 13—after the movement of the ball 23 has stopped, in the same direction according to the dashed line 22A until the control button 20 is released, the cursor 24 reaches the edge 10B of the display 10A or a new direction of movement is initiated by a movement of the ball 23 of the mouse 13. In other words, when the control button 20 is held pressed down, the cursor moves on the display automatically, without the mouse 13 being continuously moved, in the direction which has been indicated by a short direction-imparting movement 21 of the mouse 13.

Figure 3:
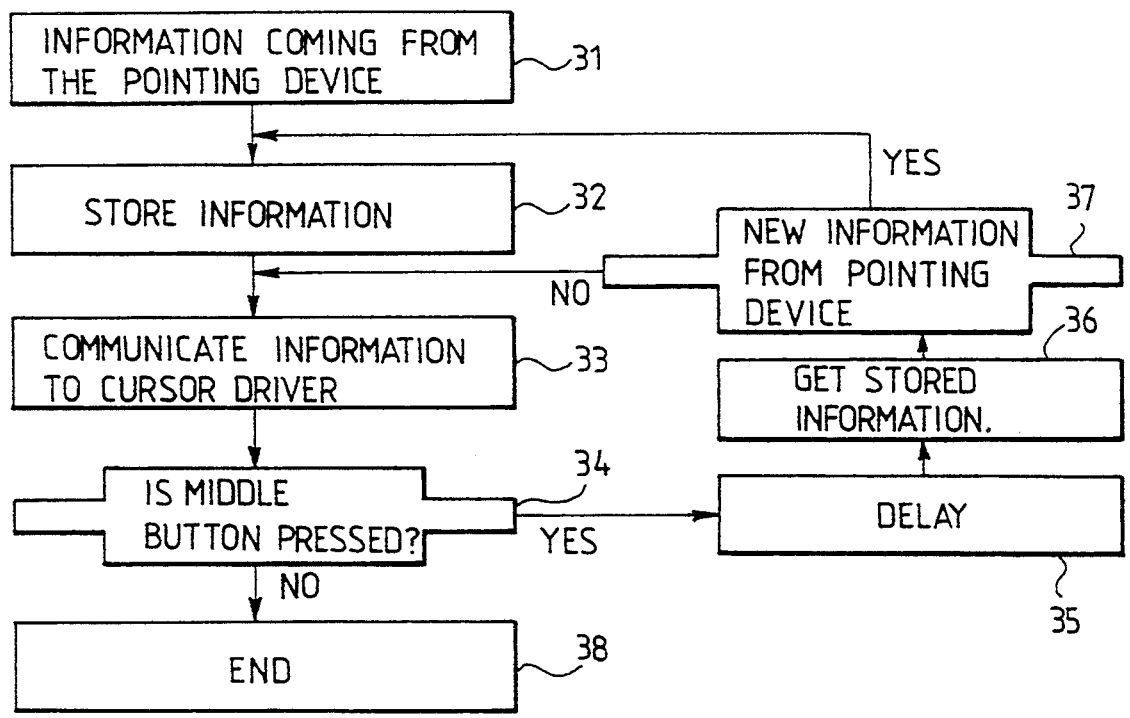
FIG. 3 is a flow chart which illustrates the operation of a mouse driver according to the invention.

The invention can be easily implemented on presently existing hardware by adding the function according to the invention to a conventional mouse driver. The block diagram of the subsidiary program required can be, for example, as shown in FIG. 3.

The subsidiary program processes the information coming from the pointing device to the mouse driver. The information received from the pointing device in program step 31 is stored in step 32 and is then communicated to the cursor driver (in the mouse driver program) in step 33. In step 34 a check is made whether the middle button 20 has been activated. If the button 20 has not been activated, the routine loops back to the main program. If the button 20 has been activated, it is necessary to wait for the duration of a predetermined delay (step 35), after which the stored information is retrieved from the memory (step 36) and a check is made whether new information has come from the pointing device (step 37). If there is no new information, the routine returns to step 32 and the stored information is recommunicated to the cursor driver. The loop 33, 34, 35, 36 and 37 is repeated until step 34 gives the result NO or step 37 the result YES. At each loop the same stored information is communicated to the cursor driver, i.e., the cursor is moved the same distance in the same direction. When step 37 gives the result NO (the pointing device sends new information), the routine goes to step 32 and stores the new information. This new information can be, for example, a new cursor direction. Thereafter steps 33 and 34 are repeated with the result that the routine either continues on in said loop or, if the new information has indicated that the middle button had been released, it returns to the main program in step 38. The speed of the function can be affected by adjusting the duration of the delay.

The figures and their description are intended only to illustrate the present invention. In their details, the method and the arrangement according to the invention can vary within the scope and spirit of the attached claims.

I claim:

1. A method of controlling the cursor movement on a computer display by means of a pointing device such as a mouse having at least two control buttons, said method comprising the steps of activating a predetermined one of the control buttons of the pointing device, manually moving the pointing device, converting the manual movement to a corresponding displayed scaled movement of the cursor on the display, stopping said movement of the pointing device and continuing said displayed movement of the cursor in the same direction on the display after manual movement of the pointing device is stopped until said predetermined one of the control buttons is released.

2. A method according to claim 1, wherein said step of manually moving the pointing device comprises moving a ball in the pointing device by displacing the pointing device along an even surface.

3. A method according to claim 1, wherein said step of manually moving the pointing device comprises manually rotating a ball of the pointing device.

4. A method in accordance with claim 1 comprising the step of stopping the displayed movement of the cursor on the display when said predetermined one of the control buttons is released.

5. A method in accordance with claim 1 wherein the step of continuing said displayed movement comprises continuing said displayed movement of the cursor in the same direction on the display until the pointing device is moved after having been stopped.

6. A method in accordance with claim 5 comprising continuing movement of the cursor on the display in a direction corresponding to a direction of movement of the pointing device after having been stopped.

7. A method in accordance with claim 1 wherein the step of continuing said displayed movement comprises continuing said movement of the cursor in the same direction on the display until the cursor reaches the edge of the display.

8. An arrangement for controlling the cursor movement on a computer display by means of a pointing device such as a mouse, which arrangement comprises a pointing device having a control ball and at least two control buttons, and a pointing device driver installed in the computer for converting a manually caused movement of the ball of the pointing device to a corresponding displayed scaled movement of the cursor on the display, said driver having a first mode in which the cursor is moved on the display only as long as the control ball of the pointing device is in movement and only a distance that is directly proportional to its travel, and a second mode which is activated when a predetermined one of the control buttons of the pointing device is activated and in which the movement of the cursor on the display that is caused by a short movement of said ball of the pointing device is continued in the same direction after the movement of the ball has stopped until said predetermined one of the control buttons is released, the cursor reaches the edge of the display or a new direction of movement is initiated by a movement of the ball of the pointing device.

* * * * *